United States Patent [19]
Velander et al.

[11] Patent Number: 5,328,603
[45] Date of Patent: Jul. 12, 1994

[54] LIGNOCELLULOSIC AND CELLULOSIC BEADS FOR USE IN AFFINITY AND IMMUNOAFFINITY CHROMATOGRAPHY OF HIGH MOLECULAR WEIGHT PROTEINS

[75] Inventors: William H. Velander; Jeffrey A. Kaster; Wolfgang G. Glasser, all of Blacksburg, Va.

[73] Assignee: The Center for Innovative Technology, Herndon, Va.

[21] Appl. No.: 932,710

[22] Filed: Aug. 19, 1992

Related U.S. Application Data

[63] Continuation-in-part of Ser. No. 496,314, Mar. 20, 1990, abandoned.

[51] Int. Cl.$^5$ .............................................. B01D 15/08
[52] U.S. Cl. ............................ 210/198.2; 210/502.1; 210/635; 210/656; 96/101; 502/404; 536/57
[58] Field of Search ..................... 536/56, 57, 124; 210/635, 656, 198.2, 502.1; 502/401, 404; 96/101

[56] References Cited

U.S. PATENT DOCUMENTS

| | | | |
|---|---|---|---|
| 2,543,928 | 3/1951 | O'Neill et al. | 18/47.2 |
| 3,179,587 | 4/1965 | Battista et al. | 210/635 |
| 3,597,350 | 8/1971 | Determann et al. | 210/635 |
| 3,598,245 | 8/1971 | Determann et al. | 210/635 |
| 3,634,394 | 1/1972 | Andreassin | 260/232 |
| 4,055,510 | 10/1977 | Peska et al. | 210/635 |
| 4,063,017 | 12/1977 | Tsao et al. | 536/57 |
| 4,090,022 | 5/1978 | Tsao et al. | 536/57 |
| 4,175,183 | 11/1979 | Ayers | 536/57 |
| 4,178,439 | 12/1979 | Ayers et al. | 536/57 |
| 4,312,980 | 1/1982 | Motozato et al. | 536/76 |
| 4,474,663 | 10/1984 | Nakajima et al. | 210/635 |
| 4,818,394 | 4/1989 | Okamota et al. | 210/635 |
| 4,902,792 | 2/1990 | Okuma et al. | 536/57 |
| 4,946,953 | 8/1990 | Okuma et al. | 106/168 |

FOREIGN PATENT DOCUMENTS

| | | |
|---|---|---|
| 2138905 | 2/1972 | Fed. Rep. of Germany ... 210/198.2 |
| 2507551 | 8/1975 | Fed. Rep. of Germany ... 210/198.2 |
| 2523893 | 12/1975 | Fed. Rep. of Germany ... 210/198.2 |
| 48060753 | 12/1971 | Japan ................................. 210/198.2 |

(List continued on next page.)

OTHER PUBLICATIONS

Kucera, J., *J. Chromatography*, 213:352-354 (1981).

(List continued on next page.)

*Primary Examiner*—Ernest G. Therkorn
*Attorney, Agent, or Firm*—Whitham & Marhoefer

[57] ABSTRACT

Improved cellulosic beads for use as supports in bioaffinity chromatography are produced by dissolution of cellulose in a chaotropic cellulose solvent, formation of the dissolved cellulose into droplets, and immersion of the droplets into a non-solvent capable of solvent interchange with the cellulose solvent to form generally spherical porous cellulose beads of narrow particle size distribution. The beads formed are preferably made with cellulose having a degree of polymerization between 100 and 200, and the resulting beads when saturated with water without drying contain between 1% and 7% cellulose by weight and have a particle size of at least about 0.3 mm. The beads can be activated by a suitable activation method, and specific bioaffinity ligands are bound to the active sites in the beads. The beads reacted ligands, the beads then used in bioaffinity chromatography to isolate specific bioaffinity molecules having molecular weights between 5,000 and 500,000 from complex solutions. The beads are particularly useful in bioaffinity chromatography of antibodies, therapeutic proteins, enzymes, and other high molecular weight proteins. The cellulose beads have similar properties to agarose beads used in the prior art for bioaffinity chromatography of high molecular weight proteins, but the cellulosic beads of the present invention have much greater mechanical strength and resist crushing under higher column flow rates without chemical cross linking are much cheaper to produce than prior art agarose and dextran beads.

8 Claims, 12 Drawing Sheets

FOREIGN PATENT DOCUMENTS

| | | | |
|---|---|---|---|
| 48-43082 | 6/1973 | Japan | 210/198.2 |
| 49-91977 | 9/1974 | Japan | 210/198.2 |
| 50-151289 | 12/1975 | Japan | 210/198.2 |
| 53-07759 | 1/1978 | Japan | 210/198.2 |
| 53-86749 | 7/1978 | Japan | 210/198.2 |
| 55-44312 | 3/1980 | Japan | 210/198.2 |
| 57092002 | 11/1980 | Japan | 210/198.2 |
| 63-56501 | 3/1988 | Japan | 210/198.2 |
| 63-83144 | 4/1988 | Japan | 210/198.2 |
| 63-90503 | 4/1988 | Japan | 210/198.2 |
| 63-90504 | 4/1988 | Japan | 210/198.2 |
| 343306 | 6/1972 | Sweden | 210/198.2 |
| 382066 | 1/1976 | Sweden | 210/198.2 |
| 382329 | 1/1976 | Sweden | 210/198.2 |
| 1234099 | 8/1968 | United Kingdom | 210/198.2 |

OTHER PUBLICATIONS

McCormack et al., *Macromolecules*, vol. 18, No. 12, (1985), "Solution Studies of Cellulose in Lithium Chloride & N,N-Dimethylacetamide", pp. 2394–2401.

Kuga, S., *J. Chromatography*, 195:221–230 (1980).

Determan, V. H. et al., *Die Makromolekulare Chemi*, 114, 263–274 (1968).

Motozato, Y. et al., *J. Chromatog.*, 298 (1984) 499–507.

Stamberg, J., *Separation and Purification Methods*, 17 (2), 155–183 (1988).

Stamberg, et al., *Affinity Chromatography and Related Techniques*, Elsevier Scientific Publishing Co., Amsterdam, pp. 131–141 (1982).

Chen, L. F., et al., *Biotechnology and Bioengineering, vol. XVIII*, pp. 1507–1516 (1976) Physical Characteristics of Porous Cellulose Beads as Supporting Material for Immobolized . . . .

Linko, Y. et al., *Methods in Enzymology, vol. 135*, pp. 268–282, 1987.

Chitumbo, K. et al., *J. Polymer Sci.: Part C*, No. 36, pp. 279–292 (1971).

Brown, W. et al., *Chemica Scripta*, 2, pp. 88–92 (1972).

Hjerten, S. et al., *Journal of Chromatography*, 215 pp. 317–322 (1981).

Kuga, S., *J. Colloid Interface Sci.*, vol. 77, No. 2 (1980) pp. 413–417.

Eltekov, N., et al., *J. Polymer Science: Polymer Symposium*, 68:247–251 (1980).

Mislovicova, D., et al., *Enzyme Microb. Technol.*, vol. 10, pp. 568–573, Sep. 1988.

Mislovicova, et al., *J. Chromato.*, 194, pp. 95–99 (1980).

Mohr, P., et al., *J. Polymer Science, Polymer Symposium*, 68:109–119 (1980).

Dean, et al., *Affinity Chromatography*, IRL Press, Washington, D.C., pp. 7–9, (1981).

Amicon Publication No. 859, Amicon Division, W. R. Grace & Co., Danvers, Mass. 01923 (1988) entire document.

Gemeiner, P., et al., *Enzyme Microb. Technol.*, 1986, vol. 8, Feb. 1986, pp. 109–114.

Campbell, D. H., et al., *Proc. Nat. Acad. Sci.*, vol. 37, (1951), pp. 575–578.

Mikes Laboratory Handbook of Chromatographic and Allied Methods, John Wiley & Sons, 1979, New York, pp. 246–247.

LIGNOCELLULOSIC AND CELLULOSIC BEADS FOR USE IN AFFINITY AND IMMUNOAFFINITY CHROMATOGRAPHY OF HIGH MOLECULAR WEIGHT PROTEINS

This invention was made with government support under NSF Grant Number BCS-8902499, awarded by the National Science Foundation. The Government has certain rights in this invention.

CROSS-REFERENCE TO RELATED APPLICATION

This application is a continuation-in-part of copending patent application Ser. No. 07/496,314, filed Mar. 20, 1990, now abandoned, the subject matter of which is incorporated herein, as though recited in full.

FIELD OF THE INVENTION

The present invention relates to bioaffinity chromatography in general, and relates more particularly to the preparation of lignocellulosic and cellulosic beads suitable for use in bioaffinity chromatography of high molecular weight proteins such as antibodies, therapeutic proteins, and enzymes.

BACKGROUND OF THE INVENTION

Bioaffinity chromatography involves the separation of specific molecules or bioaffinants from solutions through attraction to and binding by specific molecular recognition sites on stationary bioaffinity ligands attached to a chromatographic support.

The chromatographic supports used in bioaffinity chromatography are generally made in the form of beads that are made from polysaccharides, such as agarose and dextran, and other polymers, such as polyethylene oxide. An ideal solid support for use in affinity chromatography should allow for high flow rates with minimal pressure drop when processing in a column configuration. Agarose and dextran supports must be cross-linked (i.e., with epichlorohydrin) in order to achieve even a modest degree of rigidity and stability at low to moderate flow rates (e.g., 10 to 15 cm/min through a 1 cm diameter column with a 15 cm bed height). Much higher flow rates are required. This is because many of the compounds to be separated or purified are present at very low concentrations, and large volumes must flow through a column to obtain useful results.

The beads are generally small, having diameters less than about 250 microns. The widespread use of small beaded supports for column based immunoaffinity protein purification has been based upon two theories. The first theory states that antibodies are large molecules with specific activity at one end and crouding of these molecules reduces their specific activity. The second theory states that for proteins to interact with the majority of the active sites in a bead, it must diffuse into the bead to the location of the site. Thus, since the diffusion rates of most proteins are very slow, the diffusion length and therefore the bead size must be kept small. The correlary to this is that even if most of the antibody is immobilized near the surface of the bead, small beads have a larger surface area to volume ratio than large beads and therefore small beads will have lower local antibody concentrations (less crowding) than large beads for the same bulk antibody concentration. This has lead to the understanding that small beads are the only logical support for column based immunoaffinity protein separations.

The high flow rates necessary to treat large volumes tend to crush prior art beads made from materials such as crosslinked agarose or dextran. Thus, beads used as bioaffinity chromatography solid supports should have high mechanical strength to avoid crushing at high flow rates (e.g., above 20 cm/min in a 15 cm column). It has also been noted that packed column beds of nonspherical or irregular shaped particles tend to compact more readily than columns of spherical particles of the same grade. This makes it desirable to have a solid support made from spherical beads of high mechanical strength.

Certain chromatographic support materials form a gel due to hydration of the solids. These gels are preferred as bioaffinity chromatography stationary phase supports because of the large amount of binding sites available per volume of gel. The high density of binding sites provides great reactive or separative capacity. Gels are characteristically high in liquid content, containing a relatively low percentage of solids, and have a highly porous structure. The highly porous structure enables liquid to flow (perfuse) through, rather than around, the particles forming the gel. However, not all of the internal volume of the gel is necessarily accessible to all species dissolved in the liquid medium flowing through the gel. Thus, molecular sieving can occur as a result of this limited accessibility to species of different molecular size. In fact, this lack of accessibility to the internal gel particle matrices is used in gel permeation chromatography to separate molecules of different sizes.

However, in order for materials to flow through a gel, the matrix must be sufficiently porous to allow access to the internal volume of the particles making up the gel. If the gel is not sufficiently porous, undesirable clogging, molecular sieving, or low flow rates result (note, the term high porosity is used herein to indicate that the internal matrices of the gel particles, or beads, are accessible to molecules of high molecular weight, e.g., $>50,000$ daltons).

Bead cellulose forms a gel with polar solvents, such as water; and has been recommended as a support for affinity chromatography. This is due to the physical properties of cellulose beads which tolerate high column flow rates. This mechanical strength is achieved without chemical cross-linking. In addition, cellulose is less susceptible to dissolution from a wider range of chromatography solvents than other prior art support materials. Further, cellulose bead matrices do not tend to nonspecifically bind or attract (sorb) species in solution.

Binding interactions between a chromatographic support of cellulose and the components of a solution tend to occur between the ligands bound to the cellulose and the specific solution components with which they possess affinity or avidity. This results in a highly specific chromatographic support. Cellulose is also much cheaper to obtain than other prior art bead materials, such as agarose or dextran, and it is readily available throughout the world. In fact, lignocellulose (cellulose combined with lignin) is even easier to obtain since plants and trees contain lignocellulose, rather than pure cellulose. If beads for bioaffinity chromatography can be made from cellulose or lignocellulose, the efficiency of the method will improve, while the cost will decrease.

Cellulose beads have been successfully used as a support for bioaffinity chromatography of low molecular weight species. For example, Kucera, in "Affinity Chromatography Of Chymotrypsin (E.C. 3.4.21.1) On The Potato Trypsin Inhibitor Bound To Bead Cellulose By The Benzoquinone Method," Journal of Chromatography, 213, (1981) 352-354, herein incorporated by reference, bound trypsin inhibitor, prepared from potatoes, to bead cellulose in an amount of 200 mg per gram of the support. The trypsin inhibitor was bound to the bead cellulose after first activating the cellulose with benzoquinone. Affinity chromatography was then performed on a column having bound trypsin inhibitor using a solution of chymotrypsin in 0.1M Tris-glycine, pH 8.01. The chymotrypsin was eluted from the column using a buffer of 0.1M glycine-HCl at a pH of 2.07. Analysis of the column effluent via UV absorption, showed that 96.2% of the chymotrypsin was eluted with the buffer solution. Thus, Kucera was successful in performing affinity chromatography on bead cellulose with a bound ligand, trypsin inhibitor, that has a molecular weight of 14,000, which attracts a bioaffinant, chymotrypsin, that has a molecular weight of 25,000.

In spite of the success of Kucera and others in performing bioaffinity chromatography with cellulose beads, the prior art cellulose beads are incapable of binding bioaffinity ligands having molecular weights greater than 50,000. In general, only small molecular weight ligands and rigid ligands which do not have molecular recognition sites (i.e., the rigid ligands attract and bind to specific molecular recognition sites on the complementary bioaffinants) have been efficiently used for affinity chromatography. This is due to the high concentration of cellulose in the prior art beads which results in a denser bead structure of low porosity (low accessibility to the internal gel structure) when compared to beads made from materials such as agarose.

Typically, prior art cellulose beads used in bioaffinity chromatography are dried to reduce bead size, and, after drying and reconstitution in water, contain approximately 80% water by weight (20% cellulose by weight). Even at these cellulose concentrations, the beads are still insufficiently porous to allow for their use in bioaffinity chromatography of high molecular weight bioaffinants and bioaffinity ligands. However, a reduction in the amount of cellulose in the beads to make them more porous may compromise the strength of the beads.

Thus, there is a need for low cellulose beads, i.e., having reduced cellulose content, for use in bioaffinity chromatography that are sufficiently porous to allow molecules with molecular weights ranging from 5,000 to 5,000,000 to have access to their interiors; such high porosity, low cellulose beads are needed for use in bioaffinity chromatography of high molecular weight molecules, such as antibodies, therapeutic proteins, and enzymes. There is also a need for a bioaffinity chromatography support which has, in addition to the foregoing desired properties, high mechanical strength to resist crushing at high column flow rates, and which does not suffer from nonspecific adsorption by the support matrix of complex solution components. Further, there is a need for a support for high molecular weight bioaffinity chromatography which is made from an inexpensive and readily accessible material, and which is produced by a simple and inexpensive process that is readily adaptable for large scale production.

Therefore, it is a primary object of this invention to produce beads of cellulose of sufficient porosity to enable its use in bioaffinity chromatography with ligands having molecular weights between 5,000 and 500,000 and bioaffinants having molecular weights between 5,000 and 500,000.

It is a further object of this invention to produce beads of cellulose suitable for bioaffinity chromatography of high molecular weight substances which have high strength, and are inexpensive to produce.

It is yet another object of this invention to provide a process for the production of cellulose beads for use in bioaffinity chromatography having cellulose or lignocellulose present in quantities low enough to permit the beads to be used in bioaffinity chromatography of high molecular weight proteins.

It is a further object of this invention to provide a process for performing bioaffinity chromatography of high molecular weight proteins, such as, but not limited to, antibodies, therapeutic proteins, and enzymes, on bead cellulose.

SUMMARY OF THE INVENTION

These and other objects of the invention are achieved by the production of large diameter cellulose beads containing, when saturated with water, between 1% and 7% cellulose or lignocellulose. The particle size of the beads sof the invention is at least about 0.3 mm and preferably at least about 0.5 mm to produce the desired results.

The beads are formed by dissolving cellulose having a degree of polymerization up to about 200 and preferably between 100 and 200 in a chaotropic solvent of lithium chloride, LiCl, and dimethylacetamide, DMAc, at a temperature of 80°-100° C. The dissolved cellulose solution is then atomized to form droplets, and the droplets are subsequently immersed in a polar solvent that cellulose is not soluble in, and which is capable of solvent exchange with the cellulose solvent, such as, but not limited to, methanol, or a mixture of methanol and water. The dissolved cellulose in the droplets solidifies in the cellulose nonsolvent to form spherical porous beads, with the chaotropic solvent being replaced by the cellulose nonsolvent. In a preferred embodiment, the cellulose beads are activated with cyanogen bromide to create "active sites", and high molecular weight ligands (e.g., ligands having molecular weights up to about 50,000 and preferably ranging from 50,000 to 500,000 daltons) are attached at the active sites. The beads are then ready for use in bioaffinity chromatography of a specific bioaffinant; the specific bioaffinant is attracted to and bound by specific molecular recognition sites on the immobilized bioaffinity ligands on the beads.

The large diameter beaded cellulose supports produced in accordance with the present invention minimize form drag. Thus, the instant invention provides cellulose beads which provide low pressure drops while having equivalent or greater immunosorptive capacity than commercially available immunosorptive gels or resins.

DETAILED DESCRIPTION OF THE INVENTION

Figure 1:
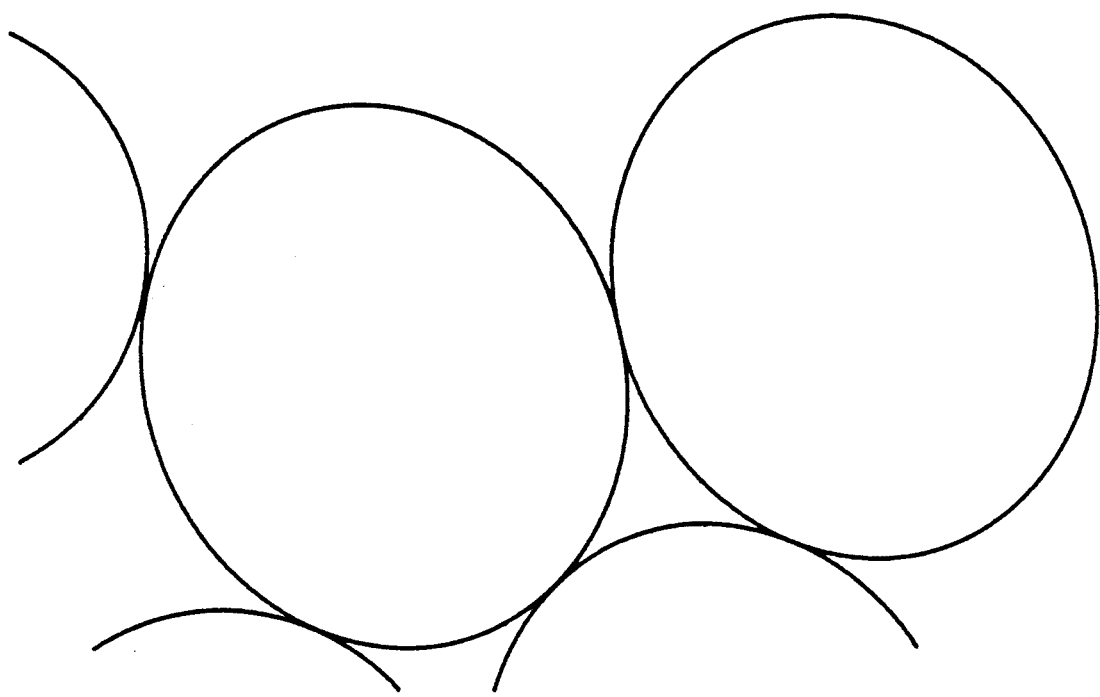
FIG. 1 is a photomicrograph of 770 micron beads containing 2.3% cellulose that were formed using a preferred embodiment of the present invention.

Cellulose consists of poly-1,4-beta D-glucopyranose, with the polymeric chains cross linked by hydrogen bonding. Due to the large amount of hydrogen bonding between cellulose polymer chains, cellulose has high mechanical strength, and is insoluble in most chromatography solvents. Thus, chromatography supports made from cellulose can be used with a wider variety of solutions in chromatographic separations than other commercial supports made from agarose or dextran (sold under the tradenames Sepharose or Sephadex, respectively), and the use of cellulose beads expedites chromatographic separations since they are less likely to crush under high flow rates than agarose or dextran.

At present, the only beads useful for bioaffinity chromatography of high molecular weight proteins are made from agarose; a commercially available agarose bead, Sepharose, has sufficient porosity to bind, after being activated, bioaffinity ligands having molecular weights over 120,000, without interfering with the ability of the specific molecular recognition sites on the bound ligands to bind to specific bioaffinants in solution. However, agarose beads can not be used at high column flow rates (linear flow rates above 20 cm/min in a 15 cm column) as they tend to crush and clog the packed bed, resulting in molecular sieving and poor separations.

Therefore, the beads of the present invention are formed to duplicate or exceed the high porosity and other desirable properties of the agarose beads, without suffering from the low mechanical strength or high cost of the agarose beads.

In solving the problems with prior art cellulose beads, it has now been found that the factors to be considered, in order of their importance, are the concentration of cellulose in the beads, the method of forming the beads, the size of the beads, and the degree of polymerization of the cellulose; all these factors determine the porosity and the strength of the resulting cellulose beads. The bead size determines the pressure drop through the system. There is a general belief that smaller beads are required to accomodate the slow diffusion rates of proteins. The shorter diffusion length of smaller beads is required if diffusion to the center of the beads is required. It has been found, however, that binding takes place predominantly at the outermost region of the beads, as will be explained more fully hereinafter.

The bead cellulose is formed by dissolving cellulose, having a degree of polymerization, dp, between 100 and 200, in a chaotropic solvent, and then resolidifying the cellulose in bead form in a nonsolvent. Note, that any lignocellulose or commercially available cellulose may be used, with higher or lower degrees of polymerization, provided beads of sufficiently high porosity will result using the process of the present invention. A suitable commercial cellulose is available from Whatman, and has a dp between 100 and 200.

The cellulose solvent is a chaotropic solvent and is thus capable of disrupting the hydrogen bonds cross-linking the glucose pyranose chains without causing substantial depolymerization of the cellulose through destruction of the polymeric ether linkages. Thus, chaotropic salts, such as, but not limited to, lithium chloride, LiCl or calcium thiocyanate, $Ca(SCN)_2$, are dissolved in polar organic solvents, such as, but not limited to, dimethylacetamide, $CH_3C(O)N(CH_3)_2$, to form the preferred chaotropic solvents for cellulose. For example, a saturated solution of lithium chloride in dimethylacetamide at 80°–100° C. can be used to dissolve cellulose. However, other cellulose solvents, known to those of skill in the art may be used, such as, but not limited to, so, in dimethylsulfoxide or solutions formed with diethylamine.

The dissolved cellulose solution is atomized to form droplets of the size desired for the resulting beads, with the droplets then being dispersed into a nonsolvent. Surface tension of the solution forming the droplets causes the droplets to assume a substantially spherical shape in the air. When the droplets enter a solution, such as methanol, in which cellulose is not soluble, the chaotropic solvent is diluted and replaced with the nonsolvent; this causes the cellulose to solidify in the shape of beads. Generally, higher surface tension results in more spherical beads.

The concentration of chaotropic salts in the chaotropic solvents used is an important factor in developing sufficiently high surface tension in the droplets of dissolved cellulose; we have found that when dimethylacetamide, DMAc, saturated with LiCl (11% LiCl) is used to dissolve cellulose for beads, atomized droplets of this dissolved cellulose solution have a surface tension sufficient to generate regular spherical beads of narrow particle size distribution upon immersion into a nonsolvent. Solutions with insufficient surface tension (e.g., cellulose dissolved in DMAc with a low LiCl concentration), will, after atomization and immersion in a nonsolvent, form undesirable beads of irregular shape that have a broad particle size distribution. For example, microscopic analysis of prior art beads showed them to be irregular in shape, and to have a large particle size distribution. With reference to FIG. 1, a photomicrograph of 770 micron beads containing about 2.3% cellulose with a dp less than 200, (purchased from Whatman), formed using a preferred embodiment of the present invention, shows them to have a highly regular, spherical shape, and to have a narrow size distribution. (Note that the narrow size distribution eliminates the need for a subsequent size sorting step.)

The formed cellulose beads are washed with an excess of water to remove any remaining chaotropic solvent from the beads so that the resulting beads contain water. For maximum porosity, it is important that the beads not be allowed to dry. Drying causes shrinking of the beads, and a reduction in the size of the pores, and neither effect is completely reversible upon rehydration with water or upon combination with a polar organic solvent. This is because the hydrogen bonding of water, or whatever polar organic solvent is present, is replaced by hydrogen bonding between the pyranose chains; thus, the cellulose would have to be redissolved in a chaotropic solvent, and reformed to obtain the predried porosity. Therefore, it is preferred that "never-dried bead cellulose" be used when high porosity is required. The term "never-dried" as used herein, means beads which have the pore and bead size of beads which have not been subjected to water removal (dehydration). Prior art never-dried bead cellulose contains approximately 90% by volume water (or 85% water, 15% cellulose by weight); this invention produces beads containing from 1-7% cellulose or lignocellulose by weight.

Because of the low cellulose concentrations of the preferred beads produced by the process of this invention, the resulting high porosity makes the internal volume of the beads accessible to high molecular weight substances. However, while decreasing the cellulose concentration increases the porosity of the cellulose beads, the mechanical strength of the beads is compromised as the cellulose concentration is reduced. Therefore, it was necessary to determine the optimal bead cellulose concentration in order to have beads with porosity great enough to allow access to high molecular weight substances, but which also can resist crushing under high flow rates in a column.

BEAD PREPARATION AND TESTING

Crushing tests were performed on prior art bead supports, as well as on cellulose beads produced by the process of the present invention with varying bead cellulose concentrations. The beads were prepared as follows: A chaotropic solution of dimethylacetamide saturated with Lithium Chloride was used to dissolve various quantities of cellulose (obtained from Whatman with a dp between 100 and 200). After dissolution of the cellulosic material, undissolved solids were removed by filtration, and the resulting cellulosic solution was then atomized into drops which were dispersed into a 1:1 methanol and water mixture. Spherical cellulose beads quickly settled to the bottom of the methanol-water mixture. After the cellulose beads had been formed, the beads were washed several times with water, and then subjected to a crushing velocity test.

The crushing velocity test consisted of pouring an aqueous slurry of the never-dried beads into a 1 cm diameter column until a packed gel bed formed; after the beads settled to form a 15 cm packed gel bed, water was pumped through the columns at linear flow rates ranging from 0 to 120 cm/min while the pressure drop through the columns was monitored. Table 1 provides data on the concentration of cellulose in the chaotropic solvent, the weight percent cellulose in the resulting beads formed in the nonsolvent, the bead size, and the flow rate velocity at or above which the beads crush.

TABLE 1

| Weight Percent Cellulose in Chaotropic Solvent | Weight Percent Cellulose in Beads | Bead Size (Micron's) | Crushing Velocity (cm/min) |
|---|---|---|---|
| 0.5 | 1.3 | 1460 ± 60 | 75 |
| 0.5 | 1.2 | 770 ± 100 | 43 |
| 1.0 | 2.3 | 1230 ± 60 | >120 |
| 1.0 | 1.9 | 770 ± 80 | 77 |
| 1.5 | 3.2 | 630 ± 110 | 108 |
| 1.75 | 4.0 | 1730 ± 160 | >120 |

Table 1 demonstrates that as the percentage of cellulose in the beads increases, the crushing velocity generally rapidly increases. The maximum flow velocity which could be measured during these experiments was 120 cm/min, which is 5 to 10 times the maximum possible flow velocity sustainable by prior art agarose beads used in bioaffinity chromatography.

Figure 2:
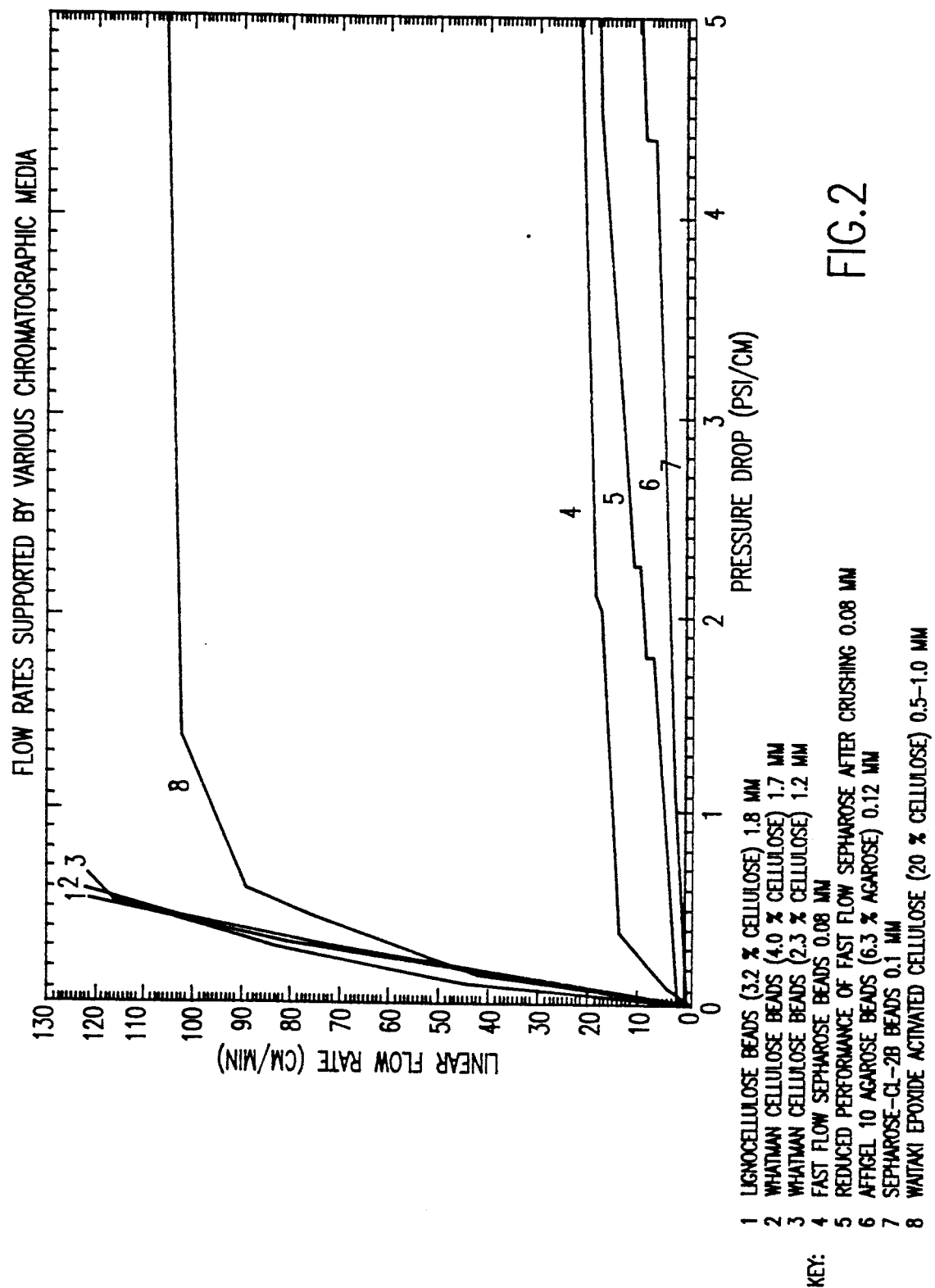
FIG. 2 is a graph of linear column flow rate versus pressure drop for various chromatographic support beads using 15 cm packed column beds in 1 cm diameter columns.

With reference to FIG. 2, the cellulose beads of the present invention were compared with prior art beads to evaluate their crushing points. The flow rates for various chromatographic supports are plotted verses pressure drop through the column. An exponential pressure drop with increased flow rate indicates crushing of the chromatographic support beads. Microscopic examination of beads removed from columns that exhibited exponential drop confirmed that the beads had been crushed. Further, those columns in which exponential pressure drop occurred had noticeable compression of the bed volume. Flow rate versus pressure drop for agarose beads are represented by curves 4, 5, 6, and 7 in FIG. 2. Note that all of the agarose beads suffered exponential pressure drop, i.e., crushing, with linear flow rates below 20 cm/min. However, beads formed from Whatman cellulose (2-4% cellulose by weight) did not suffer exponential pressure drops below the maximum flow rate measurable for this experiment, 120 cm/min.

With further reference to FIG. 2, note that curve 8 represents the flow rate verses pressure drop of prior art Waitaki epoxide activated cellulose beads containing 20% by weight of cellulose; these beads suffered exponential pressure drop at flow rates of approximately 110 cm/min. This demonstrates that the cellulose beads produced by the present invention may actually have higher mechanical strength using a lower percent cellulose than the prior art cellulose beads.

A further crushing experiment was performed on 4% cellulose beads, made by the process of the present invention, in which a 35 cm packed bed was prepared in a 1 cm diameter column, and water was pumped through at 120 cm/min. No compaction of the bed was noted, nor was there an exponential pressure drop at 120 cm/min. This demonstrates that much larger columns may be prepared with the cellulose beads of the present invention than is possible with the prior art agarose beads.

Figure 3:
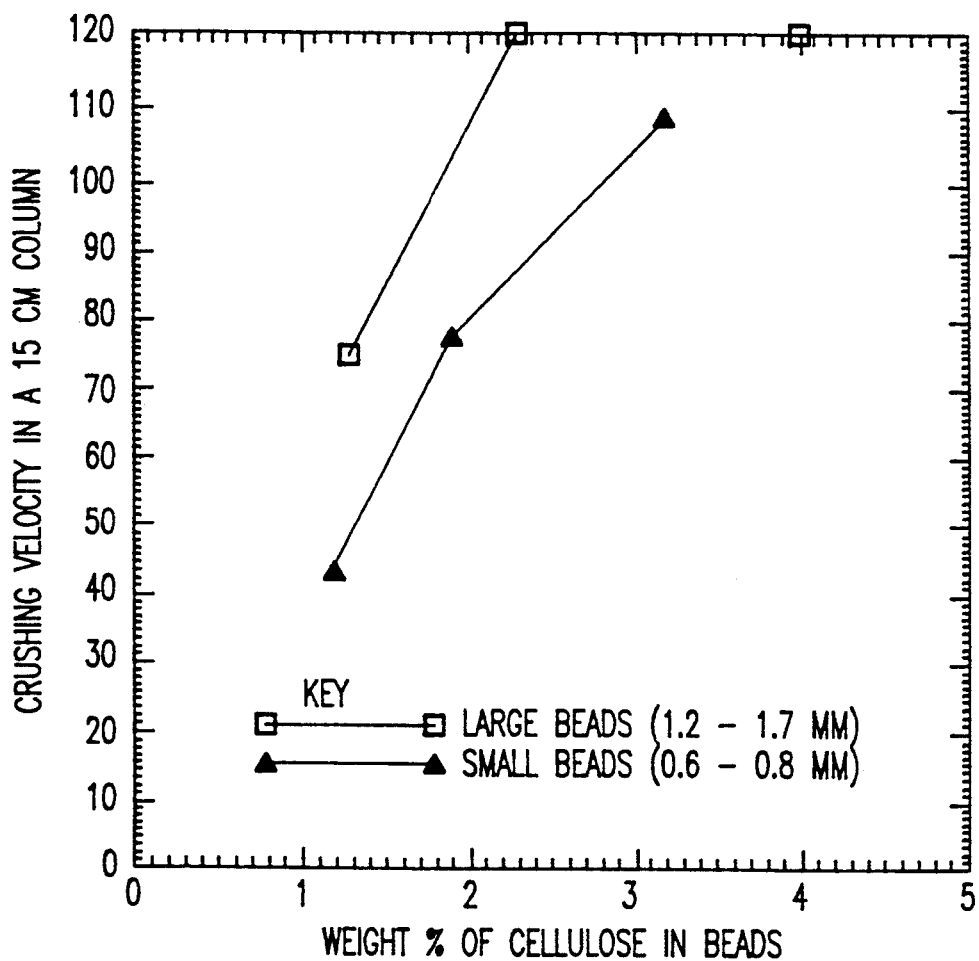
FIG. 3 is a graph of crushing velocity versus weight percent cellulose in beads formed using a preferred embodiment of the present invention.

With reference to FIG. 3, the crushing velocity versus weight percent cellulose in cellulose beads has been determined for "large beads", Line 1, and "small beads", Line 2. The small beads have sizes between 0.6 and 0.8 mm and the large beads have sizes between 1.2 and 1.7 mm. FIG. 3 shows that smaller beads tend to crush at lower column flow rates than larger beads containing the same weight percent of cellulose. FIG. 3 also indicates that cellulose beads of the present invention, having a particle size larger than 1.2 mm and containing more than 2.2 weight percent cellulose, will not crush at flow rates below 120 cm/min.

Figure 4:
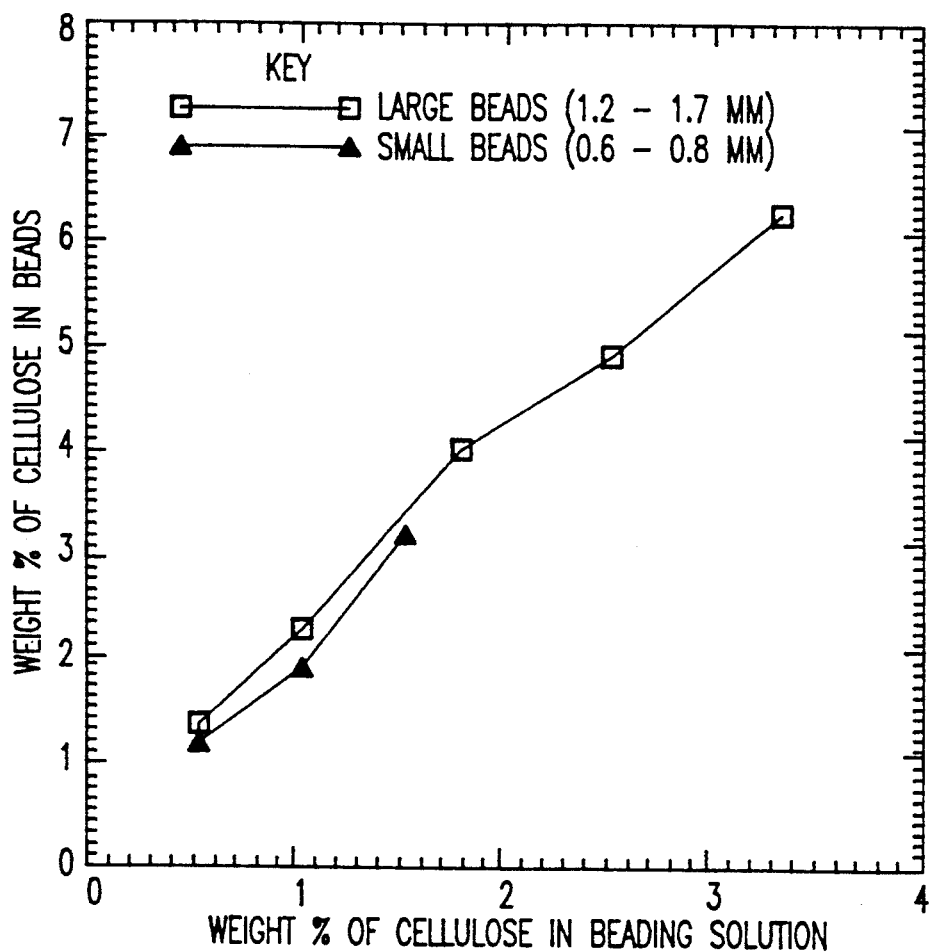
FIG. 4 is a graph of weight percent cellulose in beads formed versus the concentration of dissolved cellulose in the bead forming solution.

With reference to FIG. 4, the weight percent cellulose in beads formed is compared to the dissolved cellulose concentration of the solution used to prepare the beads. Line 1 show that beads having a size of 1.2-1.7 mm contain a weight percent of cellulose that is approximately double to the weight percent of cellulose in the beading solution. Note that beading solutions with less than 0.4% cellulose by weight have difficulty in forming beads when contacted with a nonsolvent for cellulose.

In a preferred embodiment, the bioaffinity ligands to be attached to the cellulose beads are proteins having molecular weights ranging from 5,000 to 500,000, although much larger molecular weight compounds may be bound. These proteins would include, but are not limited to, antibodies, therapeutic proteins, and enzymes. Generally, these bioaffinity ligands will not bind directly to the cellulose or lignocellulose matrix, so the matrix must be modified, or activated, to produce binding or "active" sites for attachment of the bioaffinity ligands. Since the internal surface area of the cellulose beads far exceeds the bead external surface area, the majority of active sites formed may only be assessed through the pores in the cellulose beads, requiring that the pores be of sufficiently large size.

For the purpose of binding proteins to the cellulosic beads, the active sites will preferably be nucleophilic centers which will react with amino groups in the proteins to form covalent bonds to the matrix, thus, immobilizing the proteins on the cellulose beads. Active sites may be formed by treatment of the beads with a cyanogen halide (e.g. CNBr), expoxidation, treatment with benoquinone, or any other suitable activation method known to one skilled in the art.

Since high molecular weight substances, such as immunoproteins, have specific molecular recognition sites that are highly dependent on stereochemistry for their binding ability for specific bioaffinants, it is critical that attachment of the bioaffinity ligand to the active sites on the cellulose matrix not interfere with the specific molecular recognition site or sites on the bioaffinity ligands. Thus, the beads must have sufficient porosity to eliminate steric hindrance in the specific molecular recognition sites of the bound bioaffinity ligands.

Another factor to be considered is the elimination of nonspecific interactions between the cellulose bead matrix and components of the solutions used in bioaffinity chromatography. An ideal bioaffinity chromatography support will not interact with the bioaffinity ligand except at the active site; the support matrix should not interact to any substantial degree with a specific bioaffinant or any other solution components, or interfere with the ability of the specific molecular recognition site on the bound ligand to attract and bind a bioaffinant. The specific bioaffinant to be separated or purified-should only bind to the specific molecular recognition site of the bioaffinity ligand attached to the support matrix.

Therefore, experiments were performed to evaluate suitable bead forming processes and activation methods. Selected immunoproteins were reacted with activated lignocellulosic, cellulosic, and prior art beads to evaluate their ability to bind high molecular weight immunoproteins. Additional bioaffinity chromatography experiments were then performed to determine the ability of bound bioaffinity ligands on activated prior art beads and bound bioaffinity ligands on activated beads of the present invention to selectively bind specific bioaffinants to the specific molecular recognition sites of the bound bioaffinity ligands.

EXAMPLE 1

A cellulosic raw material was prepared from wood by treatment with high pressure steam followed by sudden decompression ("steam explosion"). The cellulosic material was then dissolved in a saturated N,N-dimethylacetamide solution following the procedure of McCormack et al., Macromolecules 18, 1985, 2394, herein incorporated by reference. Note that the dissolution step may be expedited by treating the cellulosic material for several days in anhydrous dimethylacetamide. After dissolution of the cellulosic material, undissolved solids were removed by filtration or centrifugation, and the resulting viscous cellulosic solution was added dropwise into a slowly agitated solution of aqueous methanol which is a cellulose non-solvent. The cellulosic solution preferably has a concentration of cellulose ranging from 0.4% to 7%, and the aqueous methanol volume should be at least twice the volume of the cellulose beads to be generated. In a preferred embodiment, methanol-water mixtures ranging from 10:1 to 1:1 performed satisfactorily.

Once the beads were solidified in the non-solvent, the non-solvent mixture was removed by filtration or decantation, and the beads were stirred in the distilled water, with the water replaced several times to achieve complete solvent exchange and elimination of inorganics. The beads were then drained through a buchner funnel with aspiration suction, and stored in a closed container to prevent drying. The preferred beads contained between 2% and 5% solids, as determined by thermogravimetric analysis, TGA, and no detectable ash remained after combustion.

EXAMPLE 2

Never-dried steam exploded lignocellulose was obtained by treating wood (yellow poplar) chips or sugar cane residue (bagasse) with steam at 220° C. between 1.5 and 5 minutes; this was followed by washing with water and extraction with aqueous alkali. The never-dried lignocellulose had a moisture content of approximately 70%, and a cellulose content of approximately of 15-20%. The steam exploded lignocellulose was vacuum-dried on a flat filter table, and then soaked in dimethylacetamide for several days. After vacuum-filtering, the lignocellulose was dried by blowing nitrogen over the surface. One aliquot was weighed, and then subjected to drying in a vacuum oven at 80° C. for 24 hours, and then weighed again to determine the solids content. A sample of one gram of the steam exploded lignocellulose in dimethylacetamide was then added to a previously prepared solution of 9 gm Lithium Chloride in 100 ml of dried dimethylacetamide at 80° C., and stirred under nitrogen atmosphere. This produced an approximately 1% cellulose solution. After heating the cellulose at 80° C. in the dimethylacetamide lithium chloride solution for one hour, the mixture was allowed to cool to ambient temperature. Stirring was continued for 24 hours under nitrogen atmosphere. The solution was then heated to 80°-100° C. for one hour before it was cooled, and stirred under nitrogen for another 24 hours. Any insoluble matter was removed by centrifugation, and the supernatant was then added dropwise into a slowly agitated non-solvent of methanol and water to form porous lignocellulosic beads. The lignocellulose beads were washed with ten bed volumes of aqueous KOH (ph 12) to remove noncovalently bound lignin. The wash solution was monitored via UV spectrometry to ensure that the optical density of the column eluent was less than 0.001 at 214 nm.

EXAMPLE 3

The cellulosic beads of the preceding examples as well as cellulosic beads made with Whatman cellulose were subjected to activation by cyanogen bromide. This involved suspending approximately 25 gm of never-dried beads in approximately 50 ml of a 60% aqueous acetone solution at −15° C. Approximately 5 ml of 1M cyanogen bromide (CNBr) in a mixture of acetonitrile and acetone was then added to the never-dried bead suspension with vigorous stirring while maintaining the temperature at −15° C. Approximately 5 ml of a 1.5M triethylamine (TEA) solution in 60% acetone was then added dropwise over a 3 to 5 minute time period, with stirring for an additional 3 to 5 minutes after the addition of the triethylamine. The reaction mixture was then quickly poured into a washing medium at 0° C. containing approximately 200 ml of a 0.1 m HCl acetone solution. This mixture was then stirred for approximately thirty minutes before quickly filtering and washing with a large volume of water. The activated beads were stored in a storage medium of acetone, dioxane and water, 60:35:5, at a temperature of −20° C.

Although activation by cyanogen bromide is preferred, other methods of activating the cellulosic beads, including, but not limited to, activation by epoxidation or by the benzoquinone method, may be used depending on the nature of the bioaffinity chromatography problem or the expense and availability of the reactants.

BINDING OF BIOAFFINITY LIGANDS TO SUPPORT MATRICES

Tests were conducted on various activated beads to determine the degree to which different molecular weight proteins could bind to the active sites. The beads tested were prior art agarose beads (Sepharose-CL-4B), prior art cellulose beads (Waitaki epoxide activated), and lignocellulosic and cellulosic beads made by the process of the present invention.

EXAMPLE 4

Proteinaceous ligands were placed in a pH 8.0 non-nucleophilic buffer, such as 0.1M Na$_2$CO$_3$, and reacted with beads in a batch mode with stirring. The ligands used were immunoglobulin class G, IgG (molecular weight of 155,000 daltons), and wheat germ agglutinin, WGA (dimer molecular weight of 36,000 daltons). The reactions were performed at room temperature for up to four hours, or overnight at 4° C. After draining the excess ligand solution, the remaining unreacted sites on the gel were capped (reacted) with 1.0M ethanol amine. The derivatized, capped beads with bound bioaffinity ligands were transferred to columns, and washed with a minimum of 10 gel volumes of 0.1M Tris-HCl buffer (2-amino-2-hydroxymethyl-1,3-propanediol HCl) at a pH of 7.0. The beads were then stored in a 0.1M Tris-HCl buffer solution having 0.02% NaN$_3$ by weight added.

In order to determine the binding capacity of the beads for a particular bioaffinity ligand, the optical density of the initial ligand solutions were compared to the optical density of the ligand solutions drained from the beads (the dilution by liquid in the bead volume was accounted for in the concentration calculations). In addition, an aliquot of each initial ligand solution was subjected to the biuret method for total protein determination, and these results were compared to the total protein in the solutions drained from the beads reacted with the ligand solutions (also determined by the biuret method). The amounts of bioaffinity ligand (WGA or IgG) that bound to the prior art beads and the beads of the present invention are presented in Table 2.

TABLE 2

| BEAD TYPE | AMOUNT OF BOUND LIGAND (mg/ml) | |
|---|---|---|
| | WGA (MW = 36,000) | IgG (MW.155,000) |
| Sepharose | >10 | >10 |
| Lignocellulose (3%) | >10 | >10 |
| Cellulose (4%) (from Whatman) | >10 | >10 |
| Waitaki Cellulose (15-20%) | >5 | none detected |

Table 2 demonstrates the limited binding capacity of the prior art cellulose beads (Waitaki) when compared to the binding capacity of the prior art Sepharose beads and the lignocellulosic and cellulosic beads of the present invention. The prior art cellulose beads were only capable of binding less than 5 mg/ml of WGA (molecular weight of 36,000), and no binding of the IgG (molecular weight of 155,000) was noted. However, the lignocellulosic and cellulosic beads of the present invention, as well as the Sepharose beads, were able to bind in excess of 10 mg/ml of both WGA and IgG. Since the optimal quantity of bound ligand should be between 1 and 3 mg/ml due to surface density effects, Table 2 demonstrates that the cellulosic beads of the present invention are capable of binding both high and low molecular weight species at their active sites in excess of the quantities needed for optimal chromatographic separation. (If the bound ligand density is too great, the ligands interfere with each other, resulting in lower column efficiency.)

EXAMPLE 5

Columns containing activated Sepharose-CL-4B with bound WGA and bound IgG (also referred to as 7D7) were used to fractionate proteins from human plasma derivatives. Bioaffinant solutions of Cohn fraction IV-1 from human plasma and cryopoor plasma were run through WGA-Sepharose beads. Both bioaffinant solutions are high protein precursor materials containing 55 mg of protein per milliliter, mg/ml.

Cryopoor plasma contains plasma proteins with molecular weights that range from the low thousands to molecular weights in excess of 120,000 daltons. After running 10 ml of cryopoor plasma through a 65 ml column of WGA-Sepharose-CL-4B, the column was washed with a gentle wash buffer, made from a phosphate buffered saline solution (Buffer A), to remove non-binding proteins. Buffer A contains 0.25M NaCl, 0.05M sodium phosphate, 0.05 sodium azide by weight percent, and 1 mM benzamidine HCl, and has a pH of 7.2. However, other buffers, such as Tris buffered saline would work equally well.

Specifically bound proteins were then eluted from the column using a 5 to 8 mM N-acetyl glucose amine trimer ((GlcNAc)3) in Buffer A solution for approximately three column volumes. WGA binds specifically to (GlcNAc)3, so this wash elutes only those proteins bound to the WGA sugar binding sites. A 1.0M NaCl Buffer A solution was used to wash the column of any proteins bound by ionic interactions. Then, 0.1M acetic acid was used as a harsh washing solution to remove any proteins which bound non-specifically to the WGA. (WGA is stable under mild acidic conditions, allowing the use of an acid wash to clean the column and prepare it for reuse.) Note that other acid wash solutions, such as 0.05N HCl, would work equally well.

Figure 5:
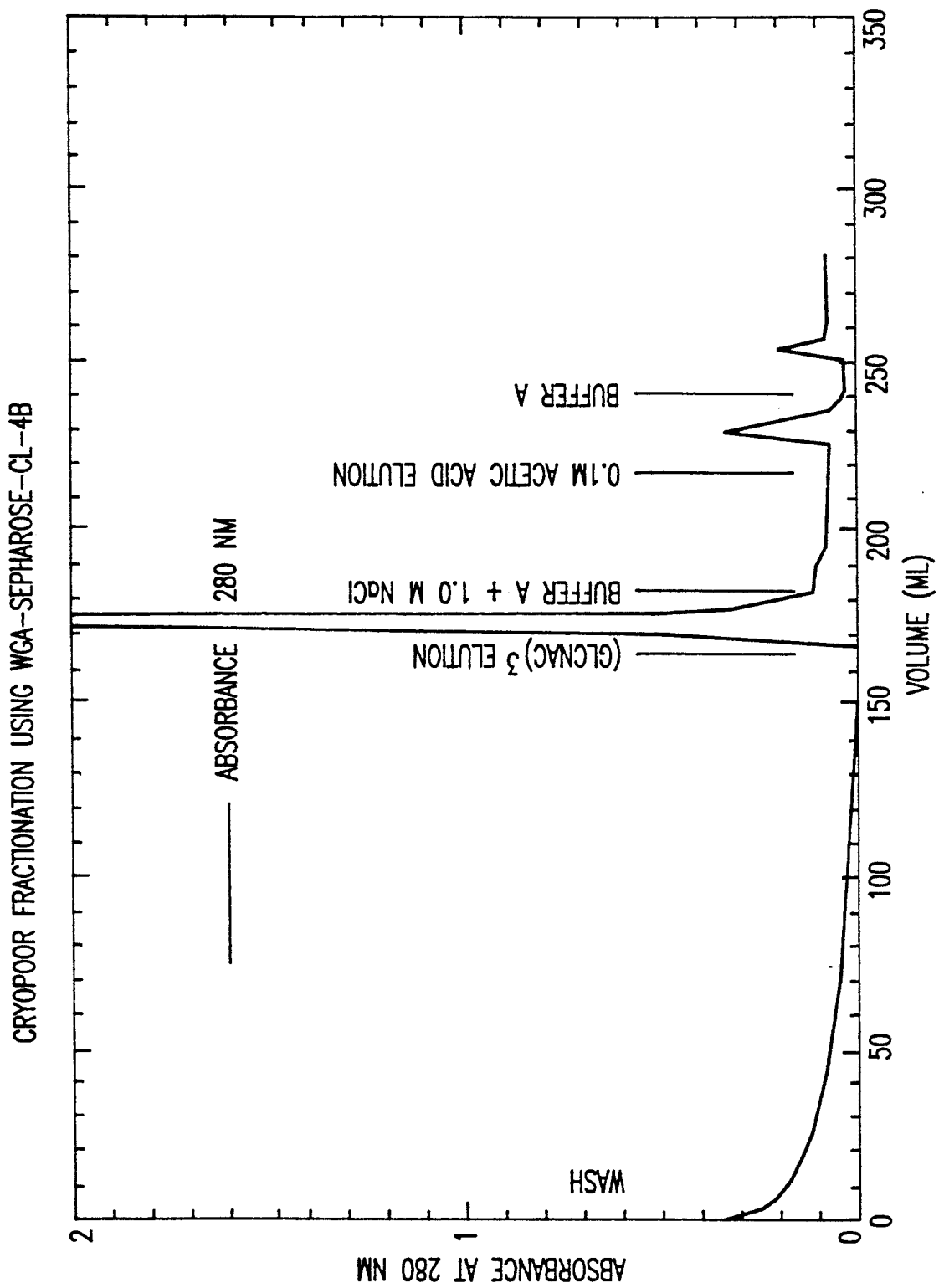
FIG. 5 is a chromatograph showing the elution of cryopoor plasma from a Sepharose-CL-4B bead column bed having wheat germ agglutinin, WGA, as the bound ligand.

FIG. 5 shows the elution of cryopoor plasma proteins from a WGA-Sepharose-CL-4B column. Viewing the chromatograph (chromatograph) of FIG. 5 from left to right, the first Peak on the chromatogram is a result of nonbinding proteins which are washed from the liquid portion of the gel; the second peak consists of those proteins that were specifically bound to the sugar binding region of the WGA; the third peak is a result of those proteins that were bound to the matrix of the WGA-Sepharose by weak non-specific interactions; the fourth peak contains any remaining proteins that are not covalently bound to the matrix (i.e., left from the acid wash). Elution of the specifically bound proteins from the columns showed that approximately 0.36 mg of plasma protein was bound per milligram of WGA. The molecular weights of the captured proteins were determined by SDS polyacrylamide gel electrophoresis with molecular weight standards.

EXAMPLE 6

7D7-Sepharose-CL-4B columns were also tested. 7D7B10 (hereinafter 7D7) is a monoclonal antibody which has a specific affinity for Vitamin K dependent proteins (i.e., coagulation regulators), all of which have a common epitope; these include protein C, prothrombin C, and complexes of protein C (the latter having molecular weights in excess of 155,000 daltons). Thus, 7D7 has an antitope (bound ligand specific molecular recognition site) for an epitope (specific bioaffinant binding site) in the Vitamin K-dependent proteins.

7D7-Sepharose-CL-4B columns were loaded with Cohn fraction IV1, containing 55 mg of protein per ml. Cohn fraction IV-1 is rich in Vitamin K-dependent proteins. 50 ml of IV-1 was applied to a 6.5 ml, 1.0 cm inside diameter, column. The column was washed with a chelating wash buffer of 0.05M Tris HCl, 0.1M NaCl, and 4 mM EDTA at a pH of 6.5, until a constant eluent optical density, OD, of less than or equal to 0.05 was read. Since 7D7 only binds protein C and prothrombin in the absence of metal ions (specifically $Ca^{++}$), a buffer containing a chelating agent, such as ethylenediaminetetraacetic acid (EDTA), was used. Calcium ions are used to effect elution, so the use of a phosphate buffered saline solution is contraindicated as a wash buffer because calcium phosphate will precipitate.

Bound proteins were eluted with a calcium containing elution buffer of 0.05M Tris HCl, 0.1M NaCl, and 25 mM CaCl, at a pH of 6.5. After the OD of the eluent returned to less than or equal to 0.05, the column was washed with 4M NaCl to remove proteins non-specifically bound to the 7d7. After a constant eluent OD was obtained, the column was re-equilibrated with EDTA wash buffer.

Figure 6:
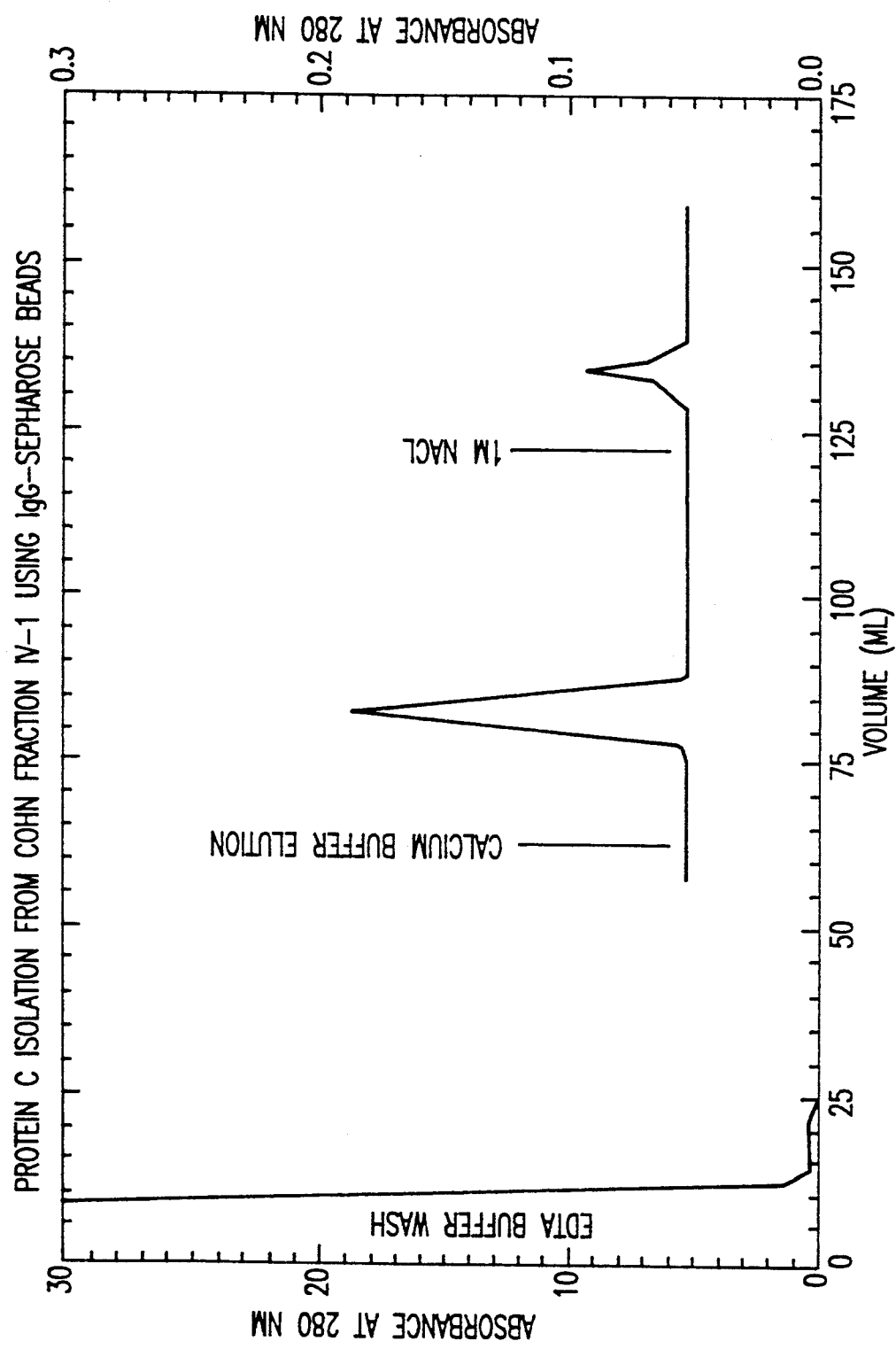
FIG. 6 is a chromatograph showing the elution of Cohn Fraction IV-1 from a Sepharose-CL-4B bead column bed having IgG-Immunoglobulin as the bound ligand (elution peak absorbance multiplied by 10).

FIG. 6 is a chromatograph of the elution of the proteins from the column. Viewing the chromatogram from left to right, the first peak is a result of those proteins not bound to the column; the second peak is a result of all proteins bound specifically to the 7d7 ($Ca^{++}$ changes the conformation of the IgG molecule, altering the binding site stereochemistry and releasing the bound bioaffinant); the third peak results from a 1.0M NaCl wash that removes nonspecifically bound proteins from the column. The molecular weights of the captured proteins were determined by SDS polyacrylamide gel electrophoresis with molecular weight standards. Approximately 0.1 mg of protein was captured per mg of IgG bound.

EXAMPLE 7

Figure 7:
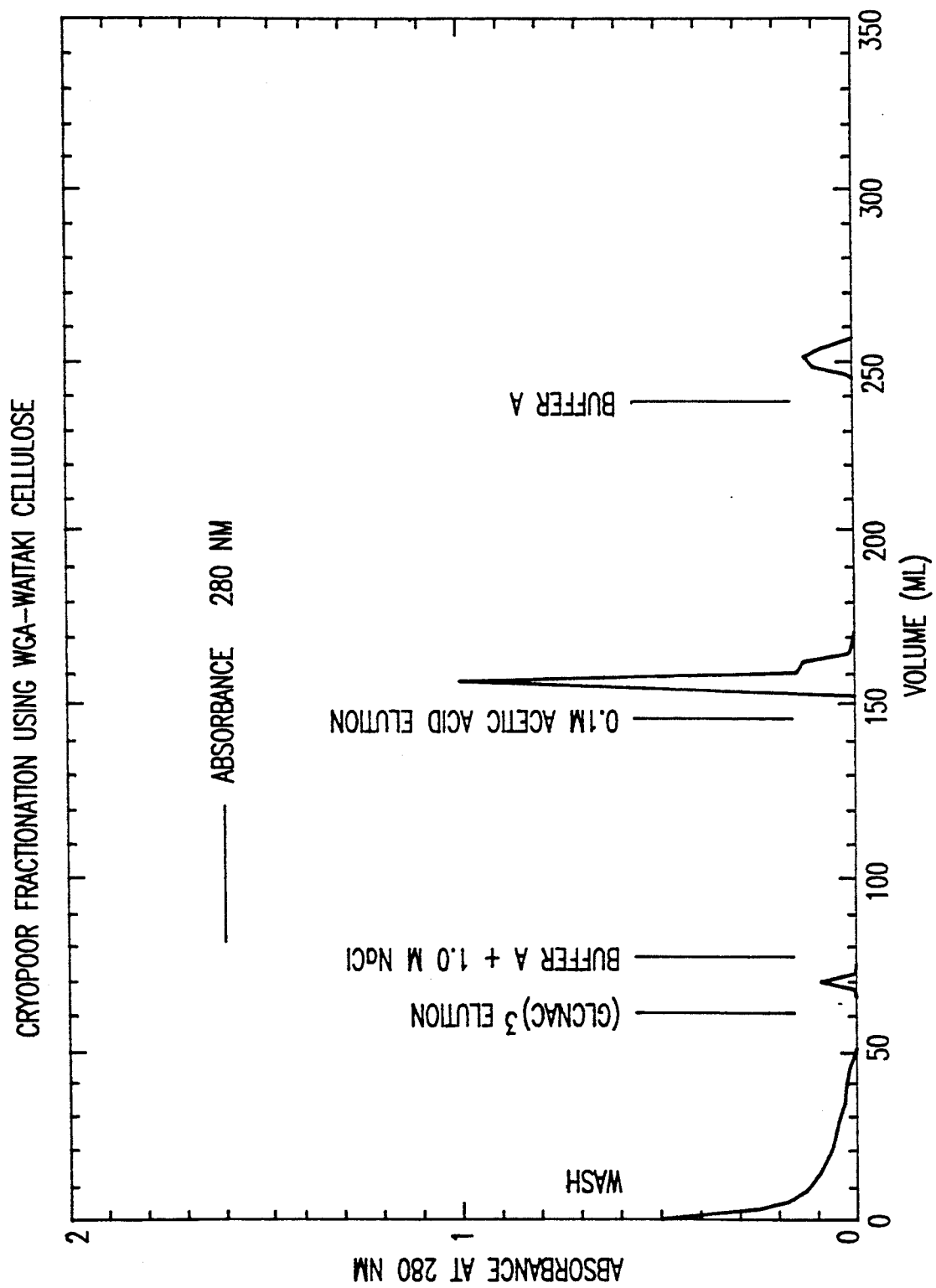
FIG. 7 is a chromatograph showing the elution of cryopoor plasma from a Waitaki cellulose bead column bed having WGA as the bound ligand.

A commercially available activated bead cellulose, epoxide activated Waitaki cellulose, bound WGA, but only at less than 4 mg of WGA per ml of the cellulose support. This binding capacity is less than half of that of the Sepharose-CL-4B. The WGA-Waitaki epoxide activated cellulose was then used in columns in an attempt to bind proteins from cryopoor plasma following the procedure of Example 5. The elution of cryopoor plasma proteins from the column is demonstrated by the chromatograph of FIG. 7. Approximately 0.26 mg protein per mg of WGA was specifically bound from the cryopoor plasma, as compared to 0.36 mg bound by the WGA-Sepharose beads. Thus, the Waitaki cellulose beads not only bound less WGA per ml of cellulose beads than the Sepharose beads, but the WGA bound to the Waitaki beads was less efficient in binding proteins than the WGA bound to the Sepharose. This is probably due to the inability of larger proteins to reach the WGA bound to the active sites in the Waitaki cellulose.

EXAMPLE 8

Figure 8:
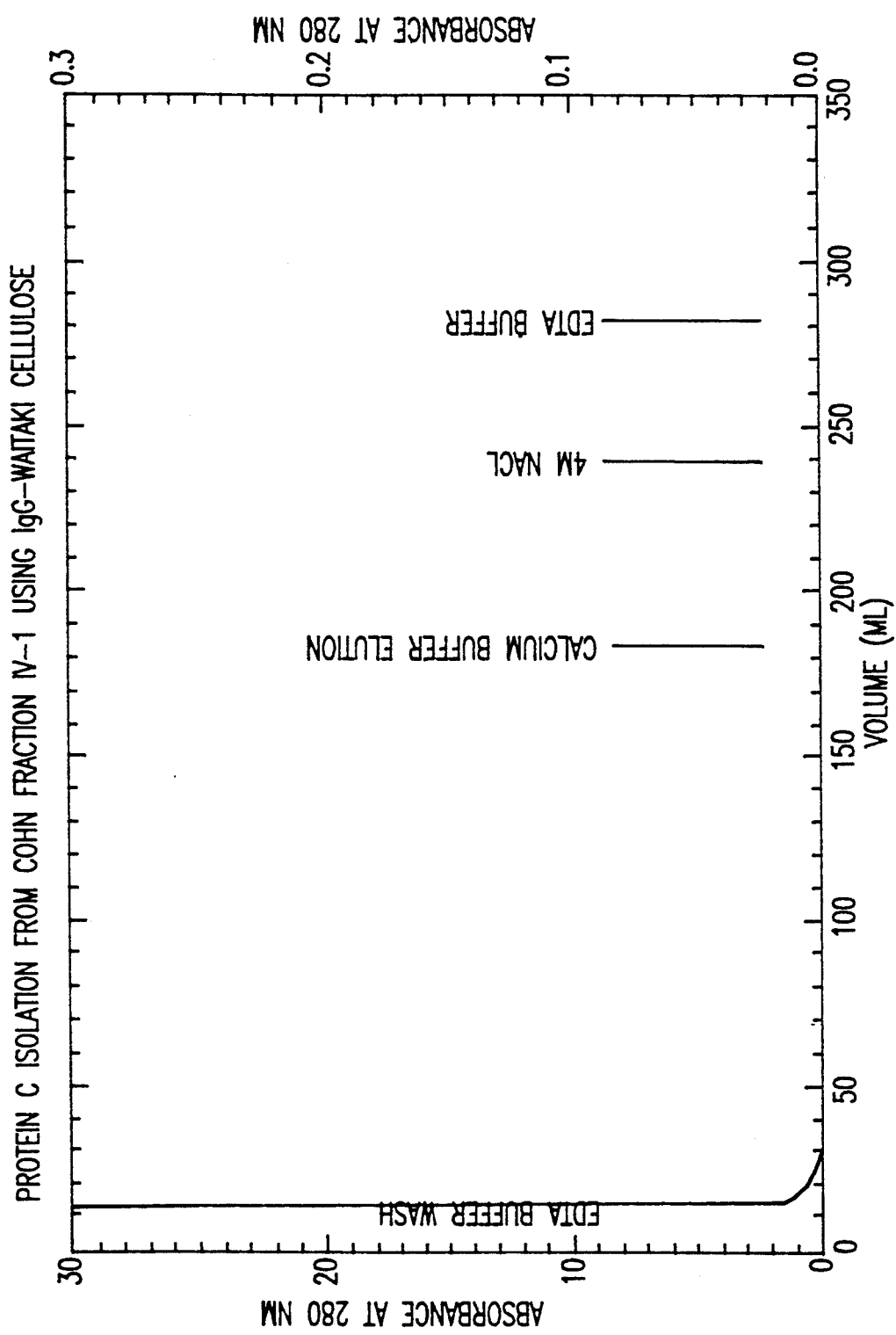
FIG. 8 is a chromatograph showing the elution of Cohn Fraction IV-1 from a Waitaki cellulose bead column bed having IgG-Immunoglobulin as the bound ligand (elution peak absorbance multiplied by 10).

The procedure of Example 6 was then followed using Waitaki cellulose beads with 7D7 as the bound ligand. As can be seen from Table 2, the amount of 7D7 bound to the Waitaki cellulose was below the detection limit of the methods used. FIG. 8 is a chromatogram of the elution of proteins from an 7D7-Waitaki cellulose bead column treated with Cohn fraction IV-1. As expected, protein binding was below the detection limits. This demonstrates that the prior art cellulose beads can-not be used for bioaffinity chromatography of high molecular weight species.

EXAMPLE 9

Figure 9:
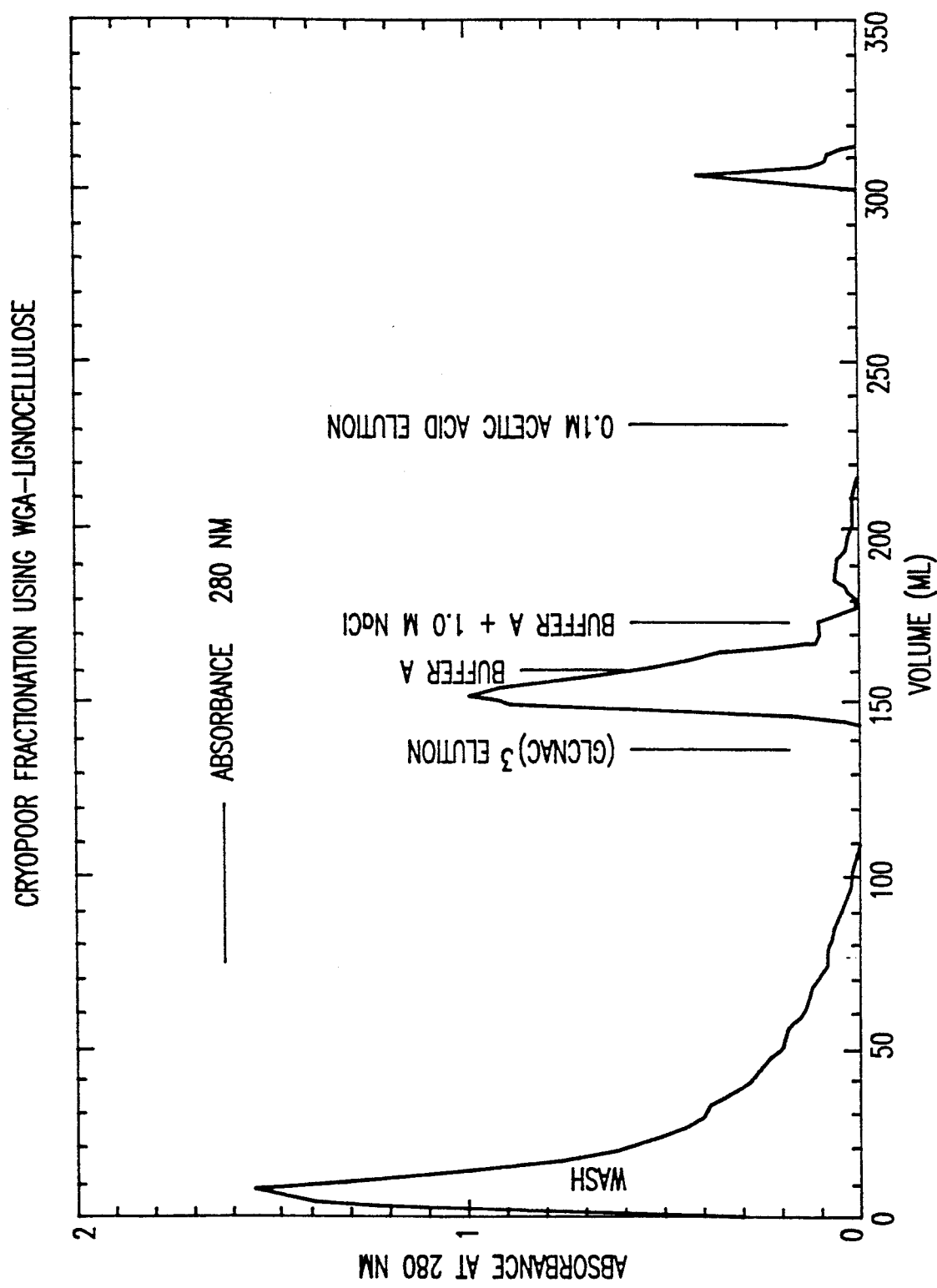
FIG. 9 is a chromatograph showing the elution of cryopoor plasma from a lignocellulose bead column bed having WGA as the bound ligand.

WGA was bound to cyanogen bromide activated lignocellulose beads, containing 3% cellulose by weight. Cryopoor plasma was then run through WGA-lignocellulose columns following the procedure of Example 5. With reference to FIG. 9, a chromatograph of the elution of proteins from the WGA-lignocellulose illustrates that it behaved in a similar fashion to the WGA-Sepharose-CL-4B; 85-90% of the bound proteins were eluted by a $5 \times 10^{-3}$M solution of N-acetyl glucoseaminetrimer,(GlcNAc)3.

EXAMPLE 10

Figure 10:
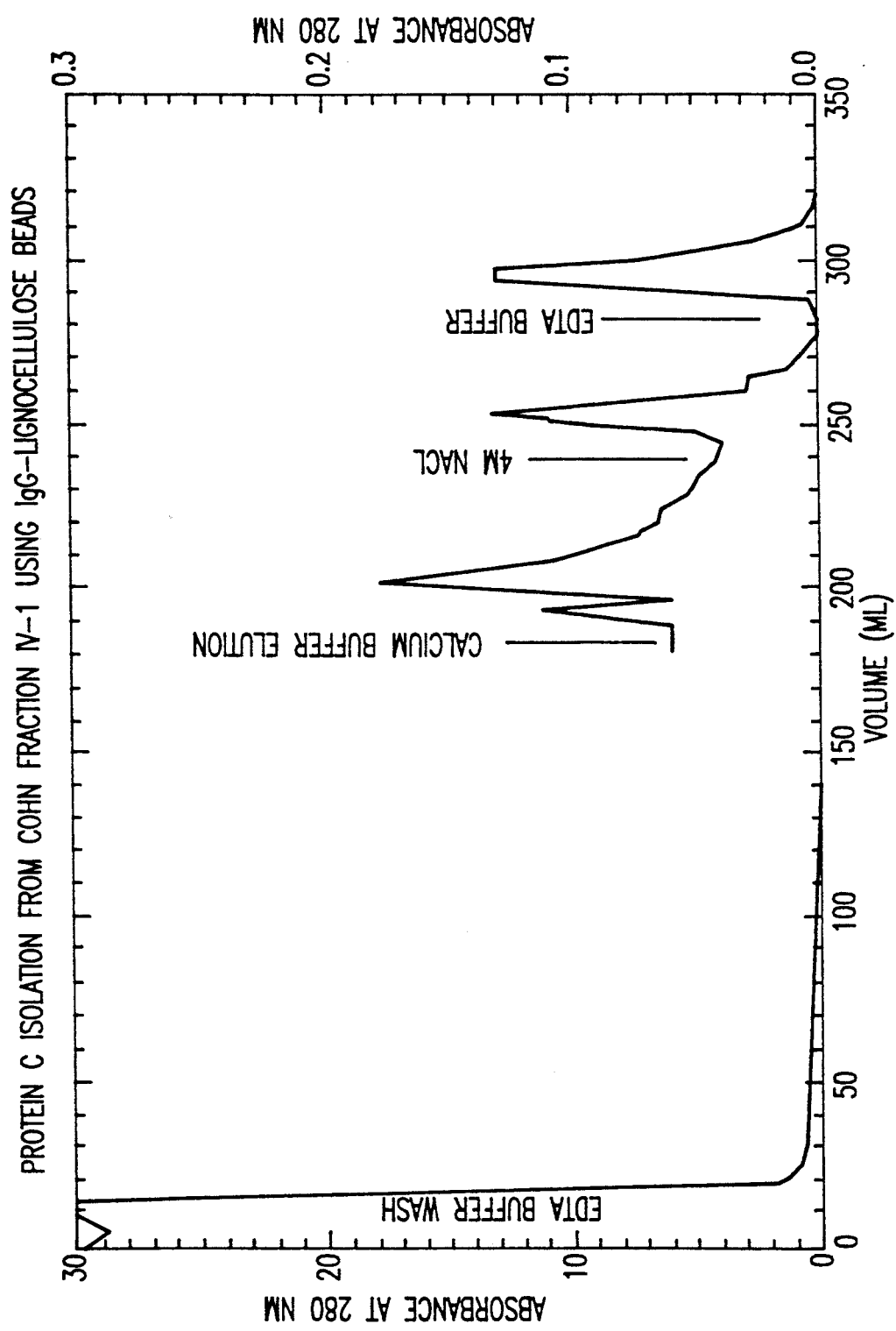
FIG. 10 is a chromatograph showing the elution of Cohn Fraction IV-1 from a lignocellulose bead column bed having IgG-Immunoglobulin as the bound ligand (elution peak absorbance multiplied by 10).

7D7 was bound to cyanogen bromide activated lignocellulose beads, containing 3.0 +/−0.5% cellulose as measured by weight before and after freeze drying. Cohn fraction IV-1 was then run through 7D7-lignocellulose columns following the procedure of Example 6. With reference to FIG. 10, a chromatograph of the elution of Vitamin K-dependent proteins from an 7D7-lignocellulose column illustrates the specific binding of high molecular weight proteins to the high molecular weight bound bioaffinity ligand.

Thus, the lignocellulosic beads of the present invention are able to both bind high molecular weight bioaffinity ligands, and utilize them in bioaffinity chromatography to bind high molecular weight bioaffinants from solution.

EXAMPLE 11

Figure 11:
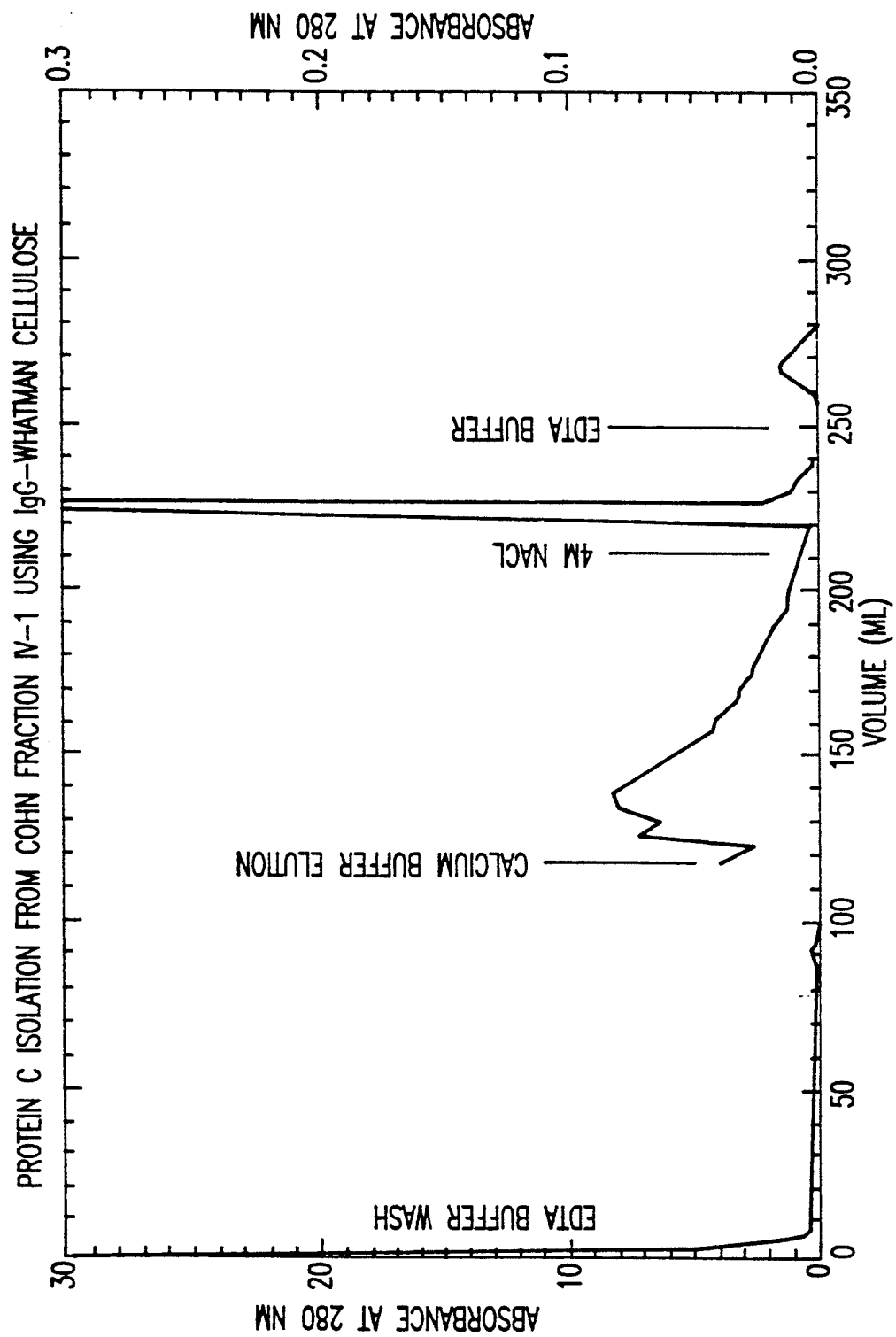
FIG. 11 is a chromatograph showing the elution of Cohn Fraction IV-1 from a Whatman cellulose bead column bed having IgG-Immunoglobulin as the bound ligand (elution peak absorbance multiplied by 10).
Figure 12:
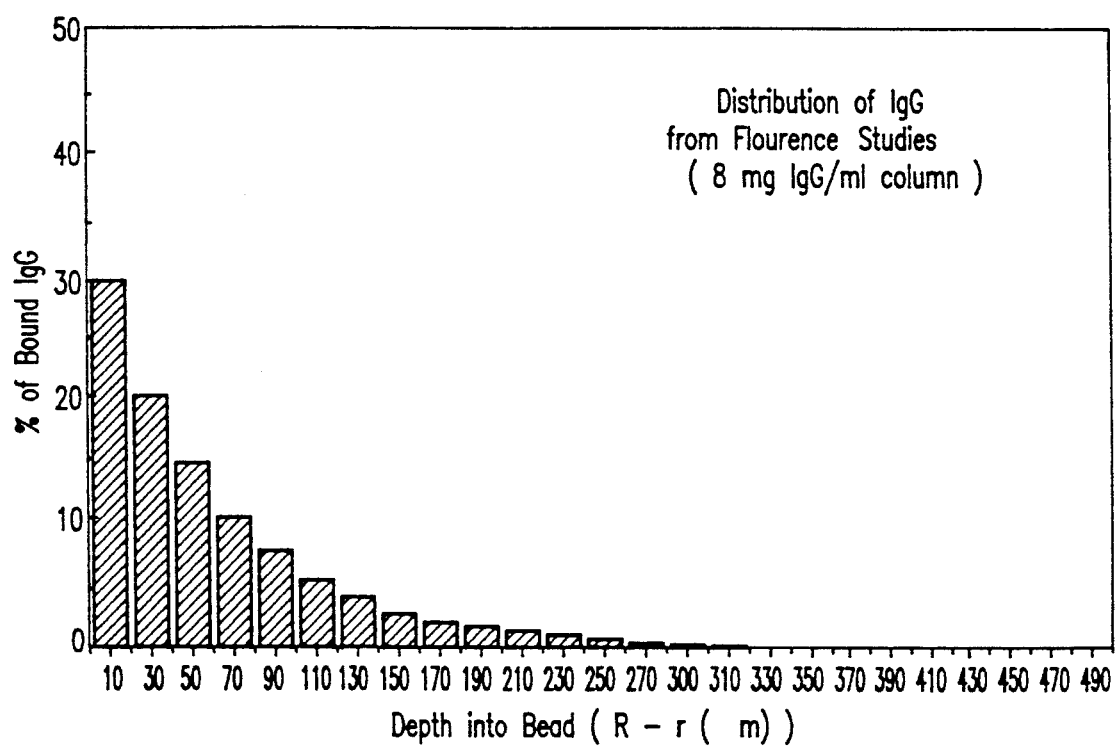
FIG. 12 is an IgG distribution graph showing % of Bound IgG versus Depth into Bead.

7D7 was bound to cyanogen bromide activated cellulose beads, containing 4% Whatman cellulose by weight. Cohn fraction IV-1 was then run through 7D7-cellulose columns following the procedure of Example 6. With reference to FIG. 11, a chromatograph of the elution of Vitamin K-dependent proteins from an 7D7-cellulose column illustrates the specific binding of high molecular weight proteins to the high molecular weight bound bioaffinity ligand. A comparison of FIG. 10 with FIG. 11, as well as a comparison of the results from Example 10 with Example 11 demonstrates that the lignocellulosic beads behave similarly to the cellulosic beads.

Table 3, below, compares the amount of WGA bound to prior art Sepharose beads, prior art Waitaki cellulose beads, and lignocellulose beads of the present invention with their ability to bind proteins from cryopoor blood plasma.

TABLE 3

| BEAD TYPE | WGA BOUND mg/ml | mg CRYOPOOR PROTEIN BOUND PER mg WGA | mg PROTEIN ELUTED WITH (GlcNAc)$_3$ PER mg WGA | mg PROTEIN ELUTED WITH ACETIC ACID PER mg WGA |
|---|---|---|---|---|
| Lignocellulose | 6.15 | 0.32 | 0.28 | 0.04 |
| Waitaki Cellulose | 3.03 | 0.26 | 0.05 | 0.21 |
| Sepharose-CL-4B | 11.08 | 0.36 | 0.34 | 0.03 |

Table 3 demonstrates that prior art WGA-Waitaki cellulose beads bound approximately 70% of the proteins that the WGA-lignocellulose or WGA-Sepharose beads bound. Further, the majority of the proteins bound to the WGA-Wataki beads were not bound at sites for which the N-acetyl glucose amine trimer compete. This indicates that most of the protein binding to the WGA-lignocellulose and WGA-Sepharose is bound specifically to the WGA binding site, while the prior art cellulose binds proteins in other ways.

The proteins eluted from beads with WGA as the bound ligand were fractionated according to molecular weight using SDS polyacrylamide gel electrophoresis, and the results are presented in Table 4 below.

TABLE 4

| BEAD TYPE/ ELUENT | PERCENT OF PROTEIN RECOVERED WITH MOLECULAR WEIGHT OF: | | | |
|---|---|---|---|---|
| | GREATER THAN 120,000 | 80,000 TO 120,000 | 25,000 TO 80,000 | LESS THAN 25,000 |
| Lignocellulose | | | | |
| (GlcNAc)$_3$ | 17 | 23 | 60 | 1 |
| Acetic Acid | 58 | 5 | 34 | 3 |
| Waitaki Cellulose | | | | |
| (GlcNAc)$_3$ | 0 | 0 | 18 | 82 |
| Acetic Acid | 0 | 0 | 7 | 93 |
| Sepharose-CL-4B | | | | |
| (GlcNAc)$_3$ | 15 | 34 | 43 | 8 |
| Acetic Acid | 13 | 38 | 38 | 12 |

Table 4 demonstrates that the prior art Waitaki cellulose beads are incapable of binding high molecular weight bioaffinants to low molecular weight bound bioaffinity ligands, such as WGA. Table 4 clearly shows that the only proteins which could bind to the immobilized WGA on the prior art cellulose beads had molecular weights less than 80,000, with the vast majority of proteins binding to the WGA having molecular weights less than 25,000.

While the prior art cellulose beads are capable of performing bioaffinity chromatography with low molecular weight bioaffinity ligands and low molecular weight bioaffinants, Table 3 demonstrates that the cellulosic beads of the present invention are capable of binding larger quantities of low molecular weight bioaffinity ligands to their active sites than the prior art cellulose beads; further, the cellulosic beads of the present invention are capable of binding low molecular weight bioaffinants to the bound ligands in far greater quantities than is possible with the prior art cellulosic beads.

Table 4 demonstrates the capacity of WGA-lignocellulose beads to bind large proteins in the 7D7 fraction range (molecular weight greater than 120,000). These results compare favorably to the high molecular weight protein binding ability of the WGA-Sepharose beads. Further, the WGA-lignocellulose beads did not suffer from the sieving effect noted with the WGA-Waitaki beaded cellulose during chromatography of high molecular weight proteins, nor do the cellulosic beads of the present invention crush at flow rates above 20 cm/min.

The lignocellulose beads were also subjected to high pH washing to deplete the lignin. After activation with cyanogen bromide, and use in bioaffinity chromatography according to the previous examples, the lignin depleted cellulosic beads still have the same flow properties and advantages in bioaffinity chromatography as the lignocellulosic beads. Crushing tests show that the depleted lignin cellulosic beads do not crush below 120 cm/min flow rates, as opposed to agarose beads which crush at 0.8–20 cm/min flow rates.

Thus, an improved chromatographic support has been made by forming cellulose into porous beads containing between 1% and 7% cellulose. The high porosity of the cellulose beads of the present invention results in an increased number of active sites per unit volume than in prior art cellulose beads. Furthermore, the larger pores of the new cellulose beads enable high molecular weight proteins and other molecules to flow through the cellulose beads, and provides greater access to active sites within the beads. The high strength of the cellulose beads allows the use of flow rates more than five times greater than it is possible to use with Sepharose beads without crushing the beads and clogging up chromatography columns. In addition, the high porosity enables high molecular weight proteins (e.g., proteins having molecular weights between 50,000 and 500,000) to be bound to the active sites in the beads, and to attract specific bioaffinants (with molecular weights between 50,000 and 500,000) to specific molecular recognition sites on the bound bioaffinity ligands.

Since many immunoproteins have specific molecular recognition sites with binding abilities that are highly dependent upon stereochemical structure, the high porosity of the new lignocellulosic and cellulosic beads enables large bioaffinity ligands to bind to active sites in the beads without distorting the stereochemistry of the specific molecular recognition sites. Further, the high porosity allows specific bioaffinants of a high molecular weight to be attracted to, and be bound by, the specific molecular recognition sites on the bound bioaffinity ligands.

While theories of operation are provided for the purpose of explaining why the instant invention produces results which be unexpected and unexplainable from the prior art teachings, it should be understood that the invention is not limited to any particular theory or explanation.

The use of large beads, having a particle size of at least aobut 0.3 mm, surprisingly provides the advantage of low flow resistance without a sacrifice in the binding capacity of the bead. The extremely low pressure drop which is experienced with the large bead system of the present invention is consistent with the use of peristaltic pumps and high pressure pumps are not required. The low pressure operation provides a high economy of operation. Conversely, the high pressures typically encountered with prior art system can produce accidental crushing and loss of the prior art support beads.

As previously noted, it would be expected that high flow rates would be incompatible with large bead sizes due to an anticipated insufficient residence time. However, the ability to bind a significant quantity of protein is not adversely affected by a high flow rate in a large bead system, because the protein is immobilized near the surface. The immobilized 7D7 is used to selectively absorb a target protein from a complex mixture.

The location of antibodies immobilized on immunoaffinity supports has been studied by several groups. Lasch et al (J. Lasch, R. Koelsch, S. Weigel, K. Blaha and J. Turkova, Affinity Chrom. and Related Tech. p. 245-254, 1982), studied the binding of leucine aminopeptidase to sepharose beads with microfluorometry. Their results point towards a high protein concentration at or near the surface of sepharose 6B beads activated with CNBr when the CNBr activating solution strength was greater than 50 mg CNBr/ml. With lower CNBr concentrations, the distribution of proteins in Sepharose 6B was homogenous. Carleysmith et al (S. W. Carleysmith, M. B. L. Eames, and M. D. Lilly, Biotech. and Bioeng. 22:957-967 1980), assumed a shrinking core model of protein binding and found that the binding BSA to Amberlite XAD-7 corresponded to a maximum penetration depth of 80 μm with an initial binding solution concentration of 2 mg/ml. From these studies it can be seen that for the supports examined, proteins are immobilized essentially at the surface of the particle.

Immunoaffinity columns are rather inefficient, the maximum utilization of the monoclonal antibody (Mab) usually falls in the range of 10 to 15% of its theoretical capacity. Several authors have also shown a decrease in Mab capacity with increasing Mab density. Tharakan et al (J. P. Tharakan, D. B. Clark and W. N. Drohan, J. Chrom. 522: 153-162 1990) show a seven fold decrease in Mab efficiency when the Mab density is increased from 0.5 mg/ml resin to 9.7 mg/ml resin. This effect was first noted by Eveleigh and Levy (J. W. Eveleigh and D. E. Levy, J. Solid-Phase Biochem., 2(1): 45 1977) and was studied by Fowell and Chase (S. L. Fowell and H. A. Chase, J. Biotech., 4: 1-13 1986). Thus Chase (H. A. Chase, Makromol. Chem., Makromol. Symp. 17: 467-482 (1988) recommends the use of low Mab density for immunoaffinity columns. It appears then that small beads will yield a higher relative an tigen binding capacity since the local antibody density will be lower in small beads than in large beads owing to the location of the antigen near the surface of the bead. This is due to the greater surface area to volume ratio that the small beads will possess. Thus, the results of higher antigen binding capacity with large beads is unexpected.

Mass transfer has also been thought to have a large affect on the efficiency of immunoaffinity columns. The diffusion coefficients of the proteins normally captured by immunoaffinity columns range from $1 \times 10^{-6}$ to $1 \times 10^{-7}$ cm$^2$/sec (M. T. Tyn and T. W. Gusek, Biotech, and Bioeng. 35: 327-338 1990). Since proteins diffuse only very slowly, Arnold et al (F. H. Arnold, W. H. Blanch and C. R. Wilke, Chem. Eng. J. 30: B9-B23 1985 and F. H. Arnold, W. H. Blanch and C. R. Wilke, Chem. Eng. J. 30: B25-B36 1985) modelled affinity columns assuming that the diffusion rate is the limiting factor in protein binding in the column. They were able to fit breakthrough curves obtained from Mab-Sepharose 4B and Mab-controlled pore glass columns using these equations. McCoy (B. J. McCoy, Biotech. and Bioeng., 27: 1477 1985 and B. J. McCoy, AlchE Symp. Ser. No. 250, 82: 115-119 1986) and Arve and Liapis (B. H. Arve and A. I. Liapis, Biotech. and Bioeng. 30: 638-649 1987; B. H. Arve and A. I. Liapis, Biotech. and Bioeng. 31: 240-249 1988; B. H. Arve and A. I. Liapis, Biotech. and Bioeng. 32: 616-627 1988) also present models that assume that the diffusion rate in conjunction with the fluid film mass transfer resistance or the reaction rate between the sorbate and the sorbent will be rate limiting steps in the adsorption of protein to the column. The assumption that the diffusion rate is a limiting factor in immunoaffinity separations has led to the use of support materials with particle diameters of 0.15 mm or less.

Table 5 shows that the theoretical plate height for the beads of the instant invention, as determined in accordance with Johnson and Stevenson, and in accordance with Mikes differs by orders of magnitude from the actual experimental data. In dramatic contradistinction, the experimental and theoretical results obtained for state of the art beads are quite closely related.

The table provides graphic evidence of the unexpected departure from the anticipated results which are encountered with large diameter, low cellulose beads as compared to the predictable results which are obtained with prior art beads.

TABLE 5

Height Equivalent to a Theoretical Plate:
Experimental Results versus Theory

| Beaded Material | System | Particle Diameter (mm) | Experimental HETP* (cm) | Calculated HETP** (cm) | Calculated HETP*** (cm) |
|---|---|---|---|---|---|
| Cellulose of VPI & SU | Anion Exchange | 0.8 | 0.2–0.6 | 72.7 | 73.9 |
| | Immuno affinity | 1.2 | 0.4–0.9 | 132 | 134 |
| Cellulose of Kuga + Agarose | Gel Filtration | 0.14 | 0.07 | 0.06 | 0.07 |
| DEAE Sepharose Fast Flow | Anion Exchange | 0.14 | 0.3–0.6 | 0.58 | 0.68 |
| Sepharose CL-4B | Immuno affinity | 0.14 | 0.4 | 0.58 | 0.68 |

* From peak width at half height - Practical Liquid Chromatography - An Introduction, R. W. Yost, L. S. Ettre and R. D. Conlon, Perkin Elmer (1980).
** E. L. Johnson and R. Stevenson, Basic Liquid Chromatography, pp. 15–31.
*** O. Mikes, "Fundamentals of Ion-exchange Chromatography", Liquid Column Chromatography: A Survey of Modern Techniques and Applications, Z. Deyl, K. Macek and J. Janek, eds., Elsevier (1975) pp. 82–83.
+ S. Kuga, "New Cellulose Gel for Chromatography", Journal of Chromatography, 195 Elsevier (1980) pp. RR221–230.

The supports used for affinity chromatography have been mainly limited to macroporous matrices such as agarose and dextran since these materials have large surface area to volume ratios. These matrices also have very large pore sizes and therefor it is assumed that the interiors of these supports are accessible to large protein molecules. The main problem with macroporous gel supports is that the available materials are not able to withstand high pressure drops. This limits the processing speed since the small particles used result in large pressure drops for even slow flow rates (J. Tharakan, F. Highsmith, D. Clark and W. Drohan, poster presented at 1990 UCLA Symposium: "Protein Purification and Biochemical Engineering" 1990). Thus a superficial velocity of 6 cm/min is considered a very fast flow rate for immunoaffinity columns at bed depths of 5 to 15 cm (L. Varady, K. Kalghatigi and C. Horvath, J. Chrom., 458: 207–215 (1988); W. M. Strauss, G. J. Broze, J. P. Miletich and H. R. Null, Biotech. and Applied Biochem., 9: 462–477 1987).

Although the preferred embodiments have been illustrated herein, it will be understood that various alterations, modifications, and substitutions may be apparent to one of skill in the art without departing from the central spirit of the invention. The scope of the invention is accordingly defined by the following claims.

I claim:

1. Beads for use in affinity chromatography, comprising:
  from about 1% to about 7% of said beads being cellulose, said beads being sufficiently porous to allow molecules with molecular weights ranging from 5,000 to 5,000,000 to have access to their interiors, having a particle size greater than about 0.3 mm, and having sufficient strength to avoid crushing when used in chromatographic separation at linear flow rates above 20 cm/min in a 15 cm column bed; active sites on said cellulose;
  bioaffinity ligands attached to said active sites, said ligands having molecular weights up to about 500,000; and specific molecular recognition sites on said ligands, said molecular recognition sites capable of selectively attracting and binding specific bioaffinants, said bioaffinants having molecular weights ranging up to about 500,000; wherein, said pores are of sufficient size to allow the attachment of said ligands to said active sites on said cellulose without altering the capability of said specific molecular recognition sites to selectively attract and bind specific bioaffinants.

2. Beads according to claim 1, wherein:
  said ligands and said bioaffinants are proteins selected from the group consisting of antibodies, therapeutic proteins, and enzymes.

3. Beads according to claim 2, wherein:
  said beads are of substantially spherical shape, and said cellulose has a degree of polymerization ranging less than about 200.

4. Beads according to claim 1, wherein:
  said beads are never dried, and are combined with an aqueous medium to form a gel.

5. Beads according to claim 1, wherein:
  said beads having a particle size of at least about 0.5 mm.

6. A chromatography support, comprising:
  highly porous cellulose beads which contain when saturated with water a content of cellulose between about 1% to 7% by weight, and a particle size greater than about 0.3 mm;
  said cellulose imparting to said beads sufficient strength to avoid crushing when used in chromatographic separation at linear flow rates above 20 cm/min in a 15 cm high bed, wherein said support is a bioaffinity support, active sites on said cellulose; bioaffinity ligands attached to said active sites, said bioaffinity ligands having molecular weights ranging up to about 500,000 said ligands having specific molecular recognition sites thereon to selectively attract and bind specific bioaffinants having molecular weights ranging up to about 500,000; and the pores of said porous beads being of sufficient size to allow the attachment of said ligands to said active sites on said cellulose without altering the capability of said molecular recognition sites in said ligands to selectively attract and bind specific bioaffinants and being sufficiently porous to allow molecules with molecular weights ranging from 5,000 to 5,000,000 to have access to their interiors.

7. The chromatography support, of claim 6, wherein said beads have a particle size greater than about 0.5 mm.

8. The chromatorgraphy support of claim 6, wherein said bioaffiants are proteins selected from the group consisting of antibodies, therapeutic proteins, and enzymes.

* * * * *